United States Patent
Finfrock et al.

(10) Patent No.: US 9,034,167 B2
(45) Date of Patent: May 19, 2015

(54) HYDROGEN/OXYGEN GENERATOR WITH D.C. SERVO INTEGRATED CONTROL

(75) Inventors: Timm J. Finfrock, Shelby Township, MI (US); James D. Hill, Lexington, KY (US); David A. Bateman, Jr., Lexington, KY (US)

(73) Assignee: Evergreen First Start Incorporated, Portland, OR (US)

( * ) Notice: Subject to any disclaimer, the term of this patent is extended or adjusted under 35 U.S.C. 154(b) by 832 days.

(21) Appl. No.: 13/048,677

(22) Filed: Mar. 15, 2011

(65) Prior Publication Data

US 2011/0220516 A1 Sep. 15, 2011

Related U.S. Application Data

(60) Provisional application No. 61/313,846, filed on Mar. 15, 2010.

(51) Int. Cl.
*C25B 1/04* (2006.01)
*C25B 15/02* (2006.01)
*C25B 15/08* (2006.01)

(52) U.S. Cl.
CPC . *C25B 1/04* (2013.01); *C25B 15/08* (2013.01); *C25B 15/02* (2013.01); *Y02E 60/366* (2013.01)

(58) Field of Classification Search
CPC ............. C25B 1/04; C25B 15/02; C25B 15/08
USPC ................................................. 205/628–639
See application file for complete search history.

(56) References Cited

U.S. PATENT DOCUMENTS

| | | |
|---|---|---|
| 2,006,676 A | 7/1935 | Garrett |
| 3,648,668 A | 3/1972 | Pacheco |
| 3,980,053 A | 9/1976 | Horvath |
| 4,023,545 A | 5/1977 | Mosher et al. |
| 4,031,865 A | 6/1977 | Dufour |
| 4,332,219 A | 6/1982 | Gonzalez |
| 4,344,831 A | 8/1982 | Weber |
| 4,382,849 A | 5/1983 | Spicer |
| 4,394,230 A | 7/1983 | Puharich |
| 4,424,105 A | 1/1984 | Hanson |
| 4,442,801 A | 4/1984 | Glynn et al. |
| 4,458,634 A | 7/1984 | Carr et al. |
| 4,763,610 A | 8/1988 | Thomas |
| 4,792,384 A | 12/1988 | Levy et al. |
| 4,795,537 A | 1/1989 | Timewell |
| 4,798,661 A | 1/1989 | Meyer |
| 4,822,469 A | 4/1989 | Shimomura et al. |
| 5,007,993 A | 4/1991 | Hull et al. |

(Continued)

FOREIGN PATENT DOCUMENTS

WO WO 2007133174 A1 * 11/2007

OTHER PUBLICATIONS

Wikipedia (http://web.archive.org/web/20100312073703/http://en.wikipedia.org/wiki/Servo) ; Mar. 12, 2010.*

*Primary Examiner* — Nicholas A Smith
(74) *Attorney, Agent, or Firm* — King & Schickli, PLLC

(57) ABSTRACT

A hydrogen/oxygen generation system includes an electrolyzer cell, a servo integrated controller, a power control module, a voltage/current feedback device and a temperature feedback device. Servo closed loop control is used to efficiently and effectively produce hydrogen and oxygen gases.

15 Claims, 1 Drawing Sheet

(56) References Cited

U.S. PATENT DOCUMENTS

| | | | |
|---|---|---|---|
| 5,037,518 A * | 8/1991 | Young et al. | 204/228.5 |
| 5,119,768 A | 6/1992 | Russell | |
| 5,389,214 A | 2/1995 | Erickson et al. | |
| 5,513,600 A | 5/1996 | Teves | |
| 5,690,797 A * | 11/1997 | Harada et al. | 204/228.5 |
| 5,711,865 A * | 1/1998 | Caesar | 205/628 |
| 5,733,421 A | 3/1998 | Pettigrew et al. | |
| 5,799,624 A | 9/1998 | Hsieh | |
| 6,126,794 A | 10/2000 | Chambers | |
| 6,209,493 B1 | 4/2001 | Ross | |
| 6,314,918 B1 | 11/2001 | McFarland et al. | |
| 6,332,434 B1 | 12/2001 | De Souza et al. | |
| 6,336,430 B2 | 1/2002 | de Souza et al. | |
| 6,508,210 B2 | 1/2003 | Knowlton et al. | |
| 6,630,061 B2 | 10/2003 | Lee et al. | |
| 6,659,049 B2 | 12/2003 | Zagaja et al. | |
| 6,723,220 B2 | 4/2004 | Speranza | |
| 6,740,437 B2 | 5/2004 | Ballantine et al. | |
| 6,797,134 B2 | 9/2004 | Weinberg et al. | |
| 6,817,320 B2 | 11/2004 | Balan et al. | |
| 6,866,756 B2 | 3/2005 | Klein | |
| 6,896,789 B2 | 5/2005 | Ross | |
| 7,048,839 B2 | 5/2006 | Harada | |
| 7,122,263 B2 | 10/2006 | Imamura et al. | |
| 7,143,722 B2 | 12/2006 | Ross | |
| 7,178,339 B2 | 2/2007 | Goldmeer et al. | |
| 7,191,737 B2 | 3/2007 | Klein | |
| 7,192,666 B2 | 3/2007 | Calhoon | |
| 7,226,529 B2 | 6/2007 | Meltser | |
| 7,240,641 B2 | 7/2007 | Balan et al. | |
| 7,430,991 B2 | 10/2008 | VanHoose et al. | |
| 7,670,701 B2 | 3/2010 | Calhoon | |
| 2002/0182463 A1 | 12/2002 | Jones et al. | |
| 2003/0205482 A1 | 11/2003 | Allen | |
| 2004/0025807 A1 | 2/2004 | Jhetham | |
| 2004/0149591 A1 * | 8/2004 | Klein et al. | 205/628 |
| 2004/0219398 A1 | 11/2004 | Calhoon | |
| 2006/0127721 A1 | 6/2006 | Calhoon | |
| 2006/0177711 A1 | 8/2006 | Calhoon | |
| 2007/0080071 A1 | 4/2007 | Perry, Jr. | |
| 2008/0202942 A1 | 8/2008 | Wilkinson et al. | |
| 2008/0220300 A1 | 9/2008 | Jones et al. | |
| 2009/0301407 A1 | 12/2009 | Cerny et al. | |
| 2010/0043435 A1 * | 2/2010 | Hinders et al. | 60/645 |
| 2010/0159339 A1 | 6/2010 | Calhoon | |
| 2010/0175941 A1 * | 7/2010 | Khodabakhsh | 180/69.5 |

* cited by examiner

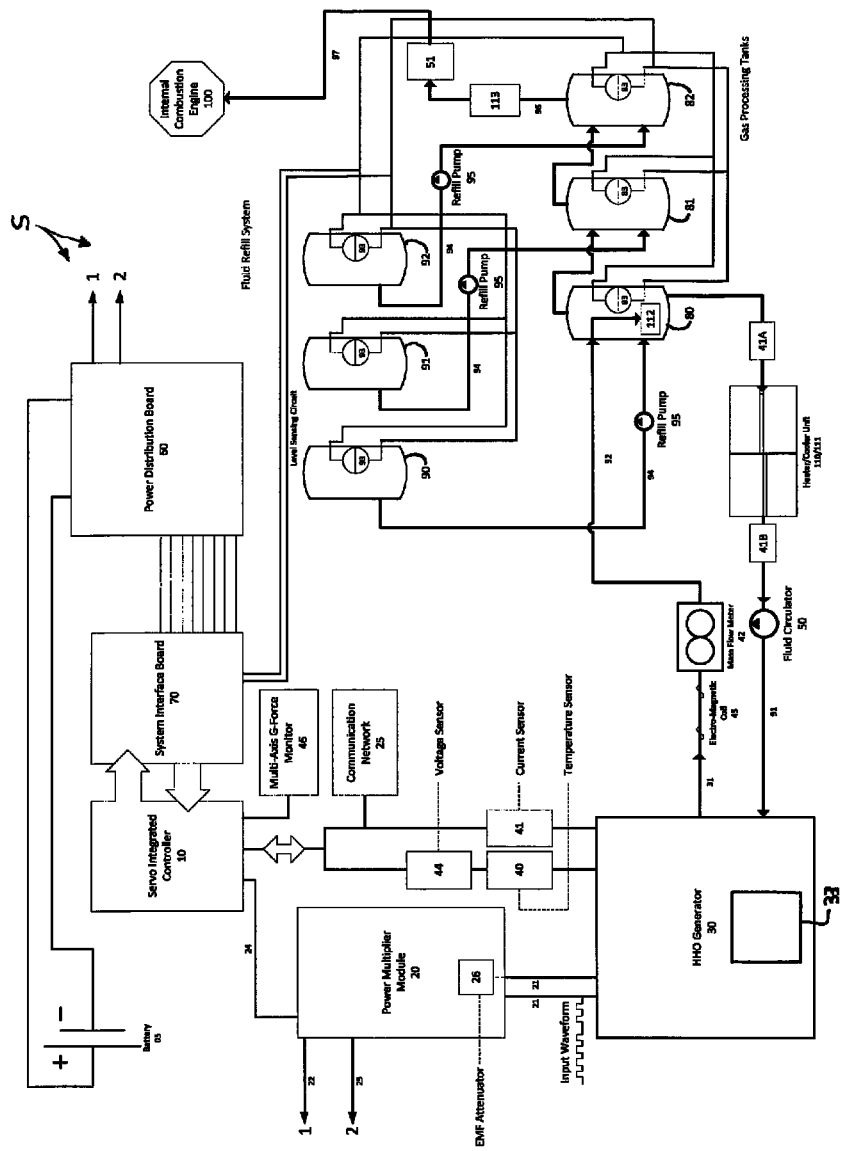

HYDROGEN/OXYGEN GENERATOR WITH D.C. SERVO INTEGRATED CONTROL

This application claims priority to U.S. Provisional Patent Application Ser. No. 61/313,846, filed 15 Mar. 2010, the entire disclosure of which is incorporated herein by reference.

TECHNICAL FIELD AND INDUSTRIAL APPLICABILITY OF THE INVENTION

This document relates generally to the generation of hydrogen and oxygen gases from water.

BACKGROUND OF THE INVENTION

Water electrolysis simply put is the decomposition of water into hydrogen ($H_2$) and oxygen ($O_2$) by passing an electrical current through it.

Over the past decade plus, many improvements have been made to the electrolyzer cell used for the electrolysis process; from the glass jars that dangled the plate assemblies in liquid to heavy plastic pipes and now more notably, thick polymer plates sandwiching together stainless steel and sealing materials to form a solid mass or "Brick" type device but, very little has been done to improve the electric control of the process.

Inherent problems with direct current (D.C.) water electrolysis are well known. One involves the need to use an electrolyte (catalyst) to improve electrical conduction. Specifically, as the electrolyzed water begins to conduct and draws current this causes heat to be produced. As the heat rises, so does the conduction. This thermal conduction cycle continues until thermal "runaway" occurs at which point the electrolysis cell looks like a dead short to the power supply—drawing enormous currents until damaging the power supply.

Another major problem is power consumption. Large amounts of power are required to sustain D.C. water electrolysis as seen above and because D.C. is constant, 100% of the power supplied is consumed by the device.

Recently, pulse-width modulators or PWM's as they are known have been used by some in an attempt to control the operating state of the elctrolyzer. Unfortunately, these "dumb" devices cannot tell how well they work in the circuit so a lot of "tweaking" is necessary to keep these systems "in tune".

PWM controller technology was commercially developed in the 1970's as a means of A.C. electric motor control. Such electric motors are inductive devices where as an electrolytic cell is more a resistive circuit with capacitive attributes. PWM's work by switching the supply current on and off very fast at varying rates like 120 Hz in a lamp dimmer to 15-20 Khz in a computer power supply. By providing full power for part of the time less power is consumed.

Another method of mitigating the thermal (current) runaway is to monitor the temperature. Once it exceeds the acceptable level, the device is switched off to let it cool down, like the thermostat in your house. The problem is that when the device is switched off no gas is produced. Many other means of "open loop" control have been attempted in the past but none have produced the desired control over the electrolytic cell.

This document describes a novel and effective approach that utilizes D.C. servo closed loop control. A servomechanism or servo is a device used to provide control of a desired operation through the use of continuous feedback. The use of servo technology is not obvious in this application because most all servo applications deal with control of motion; motor control for speed/direction, or linear application for control of cylinders or slides. The widely recognized application is in robotic application where machine motions are controlled using three dimensional algorithms to move the robot hand to a precise location in a space (work frame). By applying D.C. servo closed loop control to an electrolysis cell a more precise control of the process is attained.

SUMMARY OF THE INVENTION

A hydrogen/oxygen generation system comprises an electrolyzer cell including an electrolysis plate assembly, a servo integrated controller and a power control module connected to the electrolysis plate assembly of the servo integrated controller. The system further includes a voltage/current feedback device and a temperature feedback device, both of which are connected to the servo integrated controller. Advantageously, the system provides servo closed loop control that more efficiently and effectively produces hydrogen and oxygen gases from water in the electrolyzer cell.

In accordance with an additional aspect, a method is provided for generating oxygen and hydrogen from water and electrolyte in an electrolyzer cell. The method comprises the steps of subjecting the water and electrolyte in the electrolyzer cell to electricity in order to electrolyze the water and generate oxygen and hydrogen gases, monitoring the electrolysis process with a voltage/current feedback device and a temperature feedback device both connected to a servo integrated controller and using servo closed loop continuous feedback to control operating parameters including (a) frequency, current and voltage of electricity and (b) temperature of the water and electrolyte.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings:

FIG. 1 is a schematical block diagram of the hydrogen/oxygen generation system described in detail below.

DETAILED DESCRIPTION OF THE PREFERRED EMBODIMENTS OF THE INVENTION

Reference is now made to FIG. 1 schematically illustrating a hydrogen/oxygen generation system S. The generation system S includes an electrolyzer cell 30 including an electrolysis plate assembly 33. The system S also includes a servo integrated controller 10 operatively connected to a power control module 20, a voltage/current feedback device in the form of a current sensor 40 and voltage sensor 44 and a temperature feedback device in the form of temperature sensors 41, 41A and 41B. Advantageously, the controller 10 uses servo closed loop control to more efficiently and effectively produce hydrogen and oxygen gases from water in the electrolyzer cell 30. The electrolyzer cell 30 and the servo integrated controller 10 are more fully described below.

The system S further includes a water and electrolyte supply vessel 80, a separator/aerator vessel 81 and a secondary aerator/flash back arrestor 82. A fluid circulator 50 pumps distilled water and electrolyte from the vessel 80 to the electrolyzer cell 30 through the conduit 91. A heater and cooler unit 110, 111 connected to the controller 10 allows the system S to maintain the water and electrolyte at a desired operating temperature between, for example, −40 and 125 degrees C. Temperature sensors 41A and 41B provide the controller 10 with continuous temperature monitoring on each side of the heater and cooler unit 110, 111. The temperature sensory 41 monitors the temperature of the water and electrolyte inside the electrolyzer cell 30.

A water and electrolyte reserve reservoir 90, a separator/stripper reserve reservoir 91 and a conditioner-dryer reservoir 92 are connected, respectively, to the vessel 80, vessel 81 and arrestor 82. The reserve reservoirs 90, 91 and 92 are used to refill and maintain proper fluid levels in the respective vessels 80, 81 and arrestor 82 as described in greater detail below.

An exhaust conduit 90 connects the exhaust port of the electrolyzer cell 30 to a gas serrator 112. The serrator 112 functions to strip electrolyte and fluid from the generated hydrogen and oxygen gas. Thus, the fluid in vessel 80 is prevented from passing into vessel 81 while the hydrogen and oxygen gasses (HHO gases) are allowed to pass freely into the fluid in tank 81 for further stripping. As the HHO gas aerates out of the fluid in vessel 81 it passes into the fluid in the arrestor 82. The HHO gas then aerates out of that fluid and passes via conduit 96 to the gas micronizer 113 where the gas is coalesced down to a size that can pass through the pressure infuser 51. The pressure infuser 51 controls the amount and pressure of HHO gas passed via conduit 97 for infusion into the intake airstream of the engine 100. The controller 10 sets the amount and pressure (rate) of HHO gas that passes through the infuser 51.

A method of generating hydrogen and oxygen gases from water and an electrolyte in an electrolyzer cell will now be generally described. Such a method includes the steps of (a) subjecting the water and electrolyte in the electrolyzer cell to electricity in order to electrolyze the water and generate oxygen and hydrogen gases; (b) monitoring the electrolysis process with a voltage/current feedback device and a temperature feedback device both connected to a servo integrated controller; and (c) using servo closed loop continuous feedback to control operating parameters including (1) frequency, current and voltage of electricity and (2) temperature of said water and electrolyte.

The method also includes the steps of initializing and maintaining the temperature of the water and electrolyte within a predetermined temperature range of between about −40 and about 125 degrees C. prior to an during the electrolysis process.

Further, the method includes soft-starting the electrolysis process by varying at least one of the frequency, current, voltage and wave form of the electricity initially applied to the water and electrolyte so as to prevent damage to any coated surface of plates of the electric plate assembly 33 that might otherwise be caused by current spikes. More specifically, the electrolytic cell 30 is initially powered at a predetermined period rate according to preset parameters of the SIC 10. Toward this end the output of the pulse width modulator is varied starting at 1% to 99% depending on predetermined and set operating parameters.

The method also includes steps of initializing and maintaining a desired level of: (1) distilled water and electrolyte in the electrolyte supply vessel on tank 80; (2) separator/stripper in the separator/aerator vessel on tank 81 and (3) conditioner-dryer in the secondary aerator/flash back arrestor 82. In addition, the method includes circulating water and electrolyte from the water and electrolyte supply vessel 80 to the electrolytic cell 30 at a predetermined rate set by the controller 10 once a desired operating temperature has been reached.

Typically distilled water is used as the source of the hydrogen and oxygen to be generated. Electrical conduction is increased by adding an alkaline or acid based electrolyte (eg. Sodium hydroxide or nitric acid). If an alkaline electrolyte is used, the separator/aerator vessel or tank 81 includes water and an acidic neutralizer such as sodium bicarbonate. If an acid electrolyte is used, the separator/aerator vessel or tank 81 includes water and an alkaline neutralizer such as acetal acid. Water and/or a chemical conditioner agent such as hydroxyls are provided in the arrestor or vessel 82.

EXAMPLE 1

The following description of one possible embodiment of a hydrogen/oxygen generation system is a fundamental example in nature and is in no way intended to limit the system in its applications and/or uses.

The hydrogen/oxygen generation system S includes a servo integrated controller 10 that provides a method of control of one or more electrolyzer cells 30. Each electrolyzer cell 30 may assume any configuration that employs an anodic plate(s), a cathodic plates(s), and or a with a series neutral plates (note electrolysis plate assembly 33) whereby a fluid is used as an electrolyte to conduct current for the basic principle of electrolysis of a fluid into constituent gases under pressure, at normal standard pressure or under vacuum. Such electrolyzers 30 are known in the art and, therefore are not discussed in further detail.

The servo integrated controller (SIC) 10 provides a method of control of multiple systems and multiple output drivers (PMM's), 20 during a given predetermined period, within a base period, resulting in dividing the power amongst the number of electrolyzer cells 30 used in an application. The embodiment described in detail is capable of controlling up to six (6) single electrolyzer cells 30 at once or additional limited only by the size of the power supply, in this case the vehicle battery 05. This embodiment is not intended to limit the number of electrolyzer cells 30 in a given configuration.

The servo integrated controller 10 provides a method of control of the fluid tanks, 80, 81, 82. This embodiment uses three tanks, a water/electrolyte tank 80, a separator/aerator 81, which separates the HHO gas produced from the water/electrolyte and a secondary aerator/flash back arrestor 82, protecting the system from detonation in the event of a flame flashback from the engine 100 into which the HHO gas is being injected. Tanks 90, 91, 92 are fluid reservoirs used to hold extra fluids for tanks 80, 81, 82. When the level sensors 83 in the tanks signal to the SIC 10 a "fluid low" or "not full" condition, the fluids in the tanks 90, 91, 92 are pumped into the corresponding tank, via a fluid pump 95, via conduit 94 until the sensor 83 senses "full". A built-in over fill protection will stop the filling of the tanks if the level sensor 83 input is not seen within a predetermined time period (adjustable in seconds), This process also is initiated each time the system is powered on.

The SIC 10 continuously monitors the status of the level sensors 83, 93. Thus, depending on the logic profile of all the level sensors 83, 93, the SIC 10 can determine if the system 10 is in the correct attitude (that is: provides tilt detection). If an improper system attitude is detected, the SIC 10 initiates an emergency system shutdown. Similarly, if the level sensors 83 sense a "low" or not full condition too often during a predetermined time (as defined in the control algorithm) the SIC 10 will initiate shut down of the electrolyzer cell 30 to protect the systems from running out of fluids or over pumping fluids into a leaking tank(s) 80, 81, 82.

The SIC 10 continuously monitors the level sensors 83, 93 in each tank to protect the cell 30 from running low or empty of fluids. If the level sensor 83 signals "low" and its corresponding refill tank 90, 91, 92 level sensor 93 signals "empty" the system will shut down the cell 30 and signal a "fault" condition via an LED indicator. The servo integrated controller 10 also provides a method of control of the electrolyzer cell 30 and its electrolyte mixture by providing a switchable pulse width modulated (PWM) output from the SIC 10, to a heating or cooling device of the heating and cooling unit 110, 111. The algorithm in the SIC 10 calculates the output to the devices based on the delta 't" (change in temperature) produced between 41A, 41B also the fluid circulator 50 output (speed) and volumetric output is adjusted by the SIC 10 to aid in additional heating and or cooling as required to maintain a desired operating temperature.

In this embodiment the system configuration as shown in FIG. 1 consists of a; power source, in this case a battery 05 common to that found in automobile, truck or other various vehicle configurations such as heavy duty equipment, tractors, stand by power generators, mobile pumps, etc. Any configuration of combustion engine, internal or turbine can be used. The power distribution board, (PDB) 60 is used to separate the incoming power to the SIC 10, and the electrolyzer cell 30. The PDB 60 uses standard commercially available relays and solenoids and, as such is not discussed in further detail. The system interface board (SIB) 70, P/N 200-SIB-0001, provides a common termination point for all the Inputs/Outputs, (I/O) of the SIC 10 and power connections for the devices. Each output is fused for device protection. Two (2) operational switches provide for On/Off function as well as Run/Standby function. Four (4) LED status indicate the operational state of the system; Blue, HHO Enabled; system is ready for HHO gas production, Green, SIC 10 Ok; indicating that the device and its program is operational, Yellow, Error; indicating that the system needs attention, and Red, Fault; indicating the system is no longer in an operational state and requires attention. This board is commercially available and as such is not further discussed.

The SIC 10 is a proprietary micro-computer controller. The SIC 10 is the only known digital circuit board to consolidate all of the inputs, functions, memory registers, logic algorithms, and communications required to safely, efficiently, and reliably manage the electrolysis cell(s) 30 and supporting sub-systems contained in an on-board Hydrogen-Oxygen generation system ("System") S. The logic algorithms of the SIC 10 use servo closed loop control to run the cell or cells 30 for creating hydrogen and oxygen gases, commonly known as hydroxy gas. It also manages the other sub-systems and processes that are required to run a safe, reliable, energy efficient, and user friendly on-board hydrogen-oxygen generation system. The logic algorithms of the SIC 10 continuously monitor user defined settings, applicants pre-defined settings (proprietary), and multiple system component inputs to ensure safe and reliable operation of the system S. The power multiplier module (PMM) 20, is controlled by the SIC 10 via low voltage (5 vdc), low amperage (5 mv) signals sent via wire conduit 24. The high voltage (12 vdc-200 vdc), high current (0-450 amps) in this example is connected to the PMM 20 via wire conduits 22, 23 and the PDB 60. The PMM 20, converts the low voltage/low amperage signal to a high power output capable of operating one or more electrolyzer cells 30. The PMM 20, contains a LED light indicating the signal is present. A current transducer 40 continuously monitors the current applied to the plate assembly 33 in the electrolyzer cell 30. In the illustrated embodiment, the transducer/sensor 40 can detect currents of up to 450 DC. It should be appreciated that higher currents can be detected by using other (commercially available) transducers. An EMF attenuator 26 is connected to the output of the PMM 20 to guard against back EMF spikes into the device. The high power output of the PMM 20, is connected to an electrolyzer cell 30 via wire conduits 21. HHO gas and electrolytes are transmitted via fluidic conduit 90 into a recovery-reservoir tank. The HHO gas and electrolytes are then circulated back to the electrolyzer cell 30 via fluidic conduit 91 via the fluidic circulator 50.

In this embodiment, it is envisioned that the output of the electrolyzer cell 30 is routed via fluidic conduit 31 through an electromagnetic coil 45. This coil 45 can be utilized to measure and further excite the HHO gas present in the conduit under control of the SIC 10.

As the electrolyte solution is transmitted from the recovery-reservoir 80 to the electrolyzer cell 30 it is passed through the heating and cooling unit 110, 111, temperature sensor 41A measures the incoming fluidic temperature and sensor 41B measures the outgoing temperature. The algorithm in the SIC 10 adjusts the heating and cooling unit 110, 111 with an adjustable PWM output (1-99%) depending on parameter's set by the user. Once in the recovery reservoir 80 the electrolyte and HHO gas are separated by the gas aerating out of the liquid. The HHO gas is then passed into the next tank 81 via a gas serrator 112. The gas serrator 112 prevents the fluid in tank 80 from going into tank 81 but allows the HHO gas to pass freely. The gas is separated from the liquid in tank 81 by aerating out of the solution and passed into the next aeration or scrubber tank 82. The gas is separated from the liquid in tank 82 by aerating out of the solution and transmitted via fluidic conduit 96 to the gas micronizer 113 where it is coalesced down to a size that can pass through into the pressure infuser 51. The pressure infuser controls the amount (rate) (up to 8 slpm in this case) and pressure of HHO gas passed into the engine 100 via the control algorithm sent by the SIC 10. The HHO gas is transmitted to the engine via conduit 97 where it is infused into the intake airstream of the engine 100.

The embodiment described herein utilizes D.C. servo closed loop control. A servomechanism or servo is a device used to provide control of a desired operation through the use of continuous feedback. The proprietary algorithms along with system operation software are embedded in the "HHO Controller Rev.1.0" board, name branded as; HYDRO-MAXX™ Servo integrated controller, a multi chip, microprocessor controlled device. This controller is available from Square 1 Energy, Inc. of Lexington, Ky.

By applying D.C. servo closed loop control to electrolysis cell 30 a more precise control of the process can be attained. Using multi-channel 10 bit ADC's, (analog to digital converters) proprietary control algorithms control the current, temperature, voltage, frequency, gas output pressure and fluidic state of the cell. This is accomplished via sensors 40—current sensor, (0-100 amp) in this case 41—temperature sensor, (0*c-125*c) in this case 42—mass flow sensor (0-50 slpm) in this case 43—sonic transducer (0-50 khz) in this case 44—voltage monitor (0-48 vdc) in this case 45—electromagnetic coil pick-up 46—multi-axis O-force transducer, (0-3G's) in this case, placed throughout the cell providing continuous feedback signals that can make real-time adjustments to the operating parameters. This is an example of the type of sensors used in this embodiment and in not intended to limit the number and type of sensors that can be used in various embodiments. Once the user sets the operating parameters, by way of the operator interface the SIC 10 keeps those values optimized by varying the other aspects of operation. The various sensors allow SIC 10 to optimize operation of electrolyzer cells 30 in a wide variety of designs including for example:

- Adjustable output frequency allows "tuning" the cell of best frequency response. Adjustable from 1.97 hz to 49.99 khz or as in this case 1.97 hz-1499 hz
- Adjustable Current limits, sets operational current and current maximum. Adjustable from 0 to 100% of full load amperage provided by power source.
- Adjustable Temperature limits, sets operational temp., warm-up temp, and over temp. limits. Adjustable from −40 c-125 c
- Adjustable Voltage control, controls supply voltage to cell. Adjustable within supply voltage supplied. (+/−0.1 vdc) Adjustable Fluidic state sets and maintains the electrolyte status during operation. Tank high limit and low limit switches 83, 93.
- Adjustable fluid control sets rate (1-99% PWM) at which fluid flows through device and is self-adjusted by current, temperature, fluidic sensors, gas output and or operational pressure.
- Adjustable wave shape output, allows user to define output waveform; frequency, number of waves, on-times, (0-255), off times, (0-255), amplitude, (1-99% of power supply) and bi-polarity polarity. From low to high and high to low in the positive direction. i.e. 0 vdc-12 vdc in the case, From high to low anw low to high in the negative direction. i.e. 0 vdc to −12 vdc in this case.

Output flow/pressure adjustments (pressure infuser)[51] adjustable from 1-99% total pressure Output mass flow/pressure adjustment (0-100% full scale) servo adjustment via algorithm Output control of Electromagnetic wave generator, (1-99% PWM output) at frequency 1.97-1499 hz as in this case, or up to 50 kHz Control of voltage/current device (PMM) capable of providing high-speed switching, high-output currents and voltages to electrolyzer cell from and external power source as in a D.C. battery, or rectified A.C. source. Frequency, 1.97 hz-1499 hz in this case, or up to 22 khz maximum.

In the illustrated embodiment, the SIC 10 manages:

Multiple Electrolyzers at once; 1-6 single cells or paralleled groups of 2

Refill tank operation; between 1-3 tanks

Pump control; rate, (volume) frequency (time period)

Leveling sensing; dry contact via switches

Elevation plane sensing; tilt or angle switch

Multi-Axis G-force monitoring; accelerometer

Environmental control; heating and or cooling unit and Sonic receivers/transmitters.

Technical Specifications for SIC 10

Power Requirements: 12 VDC, 0.5 Amp supply, controller 12 VDC, up to 60 amps for output supply (depending on application)

Operating Temp range: −40 F-140 F, (−40 C-60 C)

Humidity: 90% non-condensing

Vibration/Shock: TBD/1G

CONTROLLER

Micro-Processor; 4 MHZ Clock, CPU Speed 5 MIPS, CMOS FLASH-based 8-bit microcontroller, 256 bytes of EEPROM, RAM Bytes 368, ADC up to 8 ch, 10 bit I²C™ Serial Bus Interface for up to 256 devices COMM: Serial (RS232), USB, Opt. Bluetooth™ (future)

System Inputs; 8 Pre-defined, 5 VDC, 5-20 mamps, source sinking input.

System Outputs; 10 Pre-defined, 5 VDC
4—PWM outputs
6—Digital outputs
6—Hi Current MOSFET outputs, 50 Amp rated device
4—PWM; 3—1 Amp, 1—7.5 Amp HHO Cell Digital Output; 20 mAmp driver, 6 modules available, 20-225 DC Amps continuous, 60-600 VDC with optional Power Output Modules (POM), (see chart below)

| Analog output available | (Optional) |
|---|---|
| AC output also available | (Optional) |

NOTE: Multiple Power output modules can be added in series. i.e. 600+600=1,200 Amp output.

Current Sensing (Optional)
1. Current control (Servo)
2. Current shut off

Current Sensing Ranges In Nominal Current

Accuracy=@ $I_n$, T=25*c=≤±1% of $I_n$

| $I_n$ = (A) | P current (A) |
|---|---|
| 50 | ±150 |
| 100 | ±300 |
| 200 | ±600 |
| 300 | ±900 |

| $I_n$ = (A) | P current (A) |
|---|---|
| 400 | ±900 |
| 500 | ±900 |
| 600 | ±900 |

Ambient operating range; −40*c-+85*c
Bandwidth; DC −50 Khz

For applications >600 Amps a second device can be added up to a total of 1,200 Amps Temperature Sensor (Optional)
Temperature control (Servo)
Temperature shut off
Temperature Sensing Range—−40 C-125 C
 ±2*c max accuracy from +25*c-+25*c
 ±3*c max accuracy from +0*c-+125*c
 ±2*c max accuracy from −40*c--0*c
 Polling Frequency 100 Khz Range—40*c-+185*c
 I²C™ Serial Port Interface up to 8 sensors can be used
 Output: 8 bit digital word
Fluid Monitoring
Fluidic State (Optional)
Level Sensing (Optional)
Tank sensors; Hi Level, Low Level
Auto Refill (Optional)
For each main fluid tank;
 Refill Tank, pump, solenoid valve, Fluid Level Switch, Indicating Light, Hoses, and Fittings
Fluid Heater (optional)
Pump Control
PWM Control
Steady state (On/Off)
Auxiliary Control
PWM Control
Steady state (On/Off)
Environmental Control System; ECS, (Optional), (Heating/Cooling) used in Severe Weather Applications
 PWM Control
 Steady state (On/Off)
Power Output
Module

| Model Number | Output Voltage | Output Current (continuous) | Output Current (peak) |
|---|---|---|---|
| POM-20 | 0-100 VDC | 20 amps | 60 amps |
| POM-25 | 0-200 VDC | 25 amps | 75 amps |
| POM-40 | 0-100 VDC | 40 amps | 120 amps |
| POM-75 | 0-60 VDC | 75 amps | 225 amps |
| POM-150 | 0-60 VDC | 150 amps | 450 amps |
| POM-225 | 0-60 VDC | 225 amps | 675 amps |

At 40*C

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodi-

What is claimed:

1. An hydrogen/oxygen generation system, comprising:
an electrolyzer cell including an electrolysis plate assembly;
a servo integrated digital computer controller;
a power control module connected to said servo integrated digital computer controller and said electrolysis plate assembly;
a voltage/current feedback device connected to said servo integrated digital computer controller;
a temperature feedback device connected to said servo integrated controller;
a water and electrolyte supply vessel, a separator/aerator vessel and a secondary aerator/flash back arrestor, a water and electrolyte level sensor for sensing level of water and electrolyte in said water and electrolyte supply vessel, a separator/stripper level sensor for sensing level of separator/stripper in said separator/aerator supply vessel and a conditioner-dryer level sensor for sensing level of conditioner-dryer in said secondary aerator/flash back arrestor; and
a water and electrolyte reserve reservoir, a separator/stripper reserve reservoir and a conditioner-dryer reserve reservoir connected, respectively, to said water and electrolyte supply vessel, said separator/aerator vessel and said secondary aerator/flash back arrestor;
whereby said digital computer controller uses servo closed loop control to (a) continuously monitor voltage/current and temperature feedback from said voltage/current feedback device and temperature feedback device; (b) continuously monitor levels of water and electrolyte in said water and electrolyte supply vessel, separator/stripper in said separator/aerator supply vessel and conditioner-dryer in said secondary aerator/flash back arrestor and (c) replenish water and electrolyte to said water and electrolyte supply vessel, separator/stripper to said separator/aerator supply vessel and conditioner-dryer to said secondary aerator/flash back arrestor and (d) more efficiently and effectively produce hydrogen and oxygen gases from water in said electrolyzer cell.

2. The system of claim 1, wherein said power control module is a power multiplier module connected to multiple electrolyzer cells.

3. The system of claim 1, further including a fluid circulator connected to said first conduit and said servo integrated digital computer controller.

4. The system of claim 1, further including a gas serrator and an exhaust conduit connected between said electrolyzer cell and said gas senator.

5. The system of claim 4, further including a gas micronizer and a pressure infuser downstream from said gas serrator.

6. The system of claim 1, further including a temperature control device connected to said servo integrated digital computer controller that initializes and maintains said water and electrolyte at a predetermined operating temperature.

7. The system of claim 1, further including a current control device connected to said servo integrated digital computer controller that initializes and maintains said water and electrolyte at a predetermined operating current.

8. A method of generating oxygen and hydrogen from water and electrolyte in an hydrogen/oxygen generation system, comprising:
subjecting said water and electrolyte in an electrolyzer cell to electricity via a power control module in order to electrolyze the water and generate oxygen and hydrogen gases;
monitoring the electrolysis process with a voltage/current feedback device and a temperature feedback device both connected to a servo integrated controller; and
using a servo integrated digital computer controller and closed loop continuous feedback to continuously control operating parameters including frequency, current, voltage, temperature, output pressure, and fluidic state of said system including maintaining a desired level of water and electrolyte in a water and electrolyte supply vessel during said electrolysis process, maintaining a desired level of separator/stripper in a separator/aerator vessel during said electrolysis process and maintaining a desired level of conditioner-dryer in a secondary aerator/flash back arrestor.

9. The method of claim 8, including maintaining the temperature of said water and electrolyte within a predetermined range during the electrolysis process.

10. The method of claim 9, further including initializing said electrolysis process by bringing the temperature of said water and electrolyte within said predetermined range before beginning the electrolysis process.

11. The method of claim 9, further including soft-starting said electrolysis process by varying at least 1 of frequency, current, voltage and wave form of said electricity initially applied to said water and electrolyte so as to prevent damage to any coated surface of electric plates of said electrolyzer cell that might otherwise be caused by large current spikes.

12. The method of claim 8, including initializing said electrolysis process by bringing levels of (1) water and electrolyte in said water and electrolyte supply vessel, (2) separator/stripper in said separator/aerator vessel and (3) conditioner-dryer in said secondary aerator/flash back arrestor to desired levels before beginning the electrolysis process.

13. The method of claim 12, including circulating water and electrolyte from said water and electrolyte supply vessel to said electrolytic cell at a predetermined rate once a desired operational temperature has been reached.

14. The system of claim 1, wherein said system is self-contained.

15. The system of claim 1, wherein said servo integrated digital computer controller is a digital circuit board.

* * * * *